(12) United States Patent
Ahn

(10) Patent No.: US 7,255,377 B2
(45) Date of Patent: Aug. 14, 2007

(54) BUMPER-COVER MOUNTING STRUCTURE OF CARRIER

(75) Inventor: Sung-yong Ahn, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 256 days.

(21) Appl. No.: 11/107,816

(22) Filed: Apr. 18, 2005

(65) Prior Publication Data
US 2005/0275227 A1 Dec. 15, 2005

(30) Foreign Application Priority Data
Jun. 11, 2004 (KR) .................... 10-2004-0043179

(51) Int. Cl.
*B60R 19/02* (2006.01)
(52) U.S. Cl. .................................. 293/102
(58) Field of Classification Search ................ 293/102, 293/154, 155; 296/187.03, 187.09, 203.01
See application file for complete search history.

(56) References Cited

U.S. PATENT DOCUMENTS

| | | | |
|---|---|---|---|
| 5,108,138 A * | 4/1992 | Kawaguchi ................. 293/120 |
| 5,358,304 A * | 10/1994 | Kanemitsu et al. ..... 296/193.09 |
| 6,155,633 A * | 12/2000 | Minami et al. ........ 296/193.09 |
| 6,634,702 B1 | 10/2003 | Pleschke et al. |
| 6,773,045 B2 * | 8/2004 | Grossklaus ................. 293/120 |
| 6,866,333 B2 * | 3/2005 | Saitou ................... 296/203.02 |
| 6,869,131 B2 * | 3/2005 | Kafuku et al. ......... 296/187.09 |
| 6,893,064 B2 * | 5/2005 | Satou ......................... 293/132 |
| 6,979,053 B2 * | 12/2005 | Kim ..................... 296/193.09 |
| 6,997,490 B2 * | 2/2006 | Evans et al. ............... 293/120 |
| 2003/0015882 A1 * | 1/2003 | Nagae et al. ................. 296/29 |
| 2003/0082310 A1 * | 5/2003 | Grossklaus ................ 427/421 |
| 2003/0141729 A1 * | 7/2003 | Burkhardt et al. .......... 293/133 |
| 2003/0160464 A1 * | 8/2003 | Burkhardt et al. .......... 293/102 |

FOREIGN PATENT DOCUMENTS

| | | |
|---|---|---|
| JP | 2003-237631 | 8/2003 |
| JP | 2004-001197 | 1/2004 |

OTHER PUBLICATIONS

English Language Abstract of JP 2003-237631.
English Language Abstract of JP 2004-001197.

* cited by examiner

*Primary Examiner*—H Gutman
(74) *Attorney, Agent, or Firm*—Greenblum & Bernstein, P.L.C.

(57) ABSTRACT

A bumper cover mounting structure of a carrier includes a carrier provided at the front of an engine chamber in a vehicle frame, a bumper cover provided at the front of the carrier that serves as a buffering member upon collision, the bumper cover including a plurality of establishment pieces, and a plurality of mounting brackets corresponding to the plurality of establishment pieces, respectively, and integrally formed on the supporting bracket and the head lamp mounting portions of the carrier.

3 Claims, 3 Drawing Sheets

BUMPER-COVER MOUNTING STRUCTURE OF CARRIER

RELATED APPLICATIONS

The present disclosure relates to subject matter contained in Korean Application No. 10-2004-43179, filed on Jun. 11, 2004, which is herein expressly incorporated by reference in its entirety.

BACKGROUND OF THE INVENTION

1. Field of the Invention

The present invention relates to a bumper-cover mounting structure of a carrier, and more particularly to a bumper-cover mounting structure of a carrier which has mounting brackets integrally formed at the center-front of the carrier, for clamping the inside of a bumper-cover while being horizontal to establishment pieces of the bumper-cover in a straight line, thereby reducing the assembly process of the mounting bracket and the carrier, as well as lowering manufacturing costs.

2. Description of the Related Art

Generally, regarding the technology of integrally assembling a headlamp, a radiator, a condenser, a bumper, and the like to a frame panel of a vehicle to enhance assembly efficiency at a jobsite, and to ensure precise assembly thereof, an FEM (Front End Module) is applied to a carrier of the vehicle.

As shown in FIGS. 1 and 2, a carrier 10 comprises a headlamp mounting portion 11 formed at either side of an upper portion of the carrier 10; a cooling-module mounting portion 12 for mounting a cooling module (not shown), such as a radiator and a condenser, at the front of the cooling module mounting portion; a supporting bracket 14, connected downwardly from the middle of an upper frame 13 of the cooling module mounting portion 12 for mounting a horn speaker of the vehicle thereon; and a lower frame, 15 formed at a lower portion of the cooling motor mounting portion 12, for mounting a bumper and a fog lamp thereon.

The carrier 10 is coupled at the front thereof to a bumper-cover 20.

Here, the carrier 10 has mounting brackets 30 fastened to the headlamp mounting portion 11 and the supporting bracket 14 in a straight line, respectively.

Specifically, with one end of each of the mounting brackets downwardly bent to face the headlamp mounting portion 11 and the supporting bracket 14, respectively, the mounting brackets 30 are fastened to the headlamp mounting portion 11 and the supporting bracket 14 by screws 32, respectively.

Here, each of the mounting brackets 30 is coupled at the other end thereof to the inside of the bumper-cover 20, so that the bumper-cover 20 is firmly mounted on the carrier.

However, in order to mount the bumper-cover on the carrier, it is necessary to additionally provide a mounting bracket, and to clamp the mounting bracket to the carrier with the screws, resulting in an increase in the number of assembly processes, thereby reducing operational efficiency and productivity.

SUMMARY OF THE INVENTION

The present invention has been made to solve the above problems, and it is an object of the present invention to provide a bumper-cover mounting structure of a carrier which has a plurality of mounting brackets integrally formed on the carrier, such that each of the plurality of mounting brackets is formed at the front of the carrier while being horizontal to an establishment piece of the bumper-cover in a straight line to mount the bumper-cover on the carrier, thereby reducing a fastening process of the bumper-cover, leading to a maximization in both the reduction of manufacturing costs and in productivity.

In accordance with an aspect of the present invention, the above and other objects can be accomplished by the provision of a bumper-cover mounting structure of a carrier including: a carrier, provided at the front of an engine chamber in a vehicle frame and comprising a supporting bracket for connecting an upper frame and a lower frame, being in parallel to each other, at the center of the upper and lower frames, and a headlamp mounting portion formed at either end of the upper frame; a bumper-cover provided at the front of the carrier for serving as a buffering member upon collision and comprising a plurality of establishment pieces extending to define a fastening groove, respectively, at the rear side of the bumper-cover; and a plurality of mounting brackets corresponding to the plurality of establishment pieces, respectively, and integrally formed on the supporting bracket and the headlamp mounting portion of the carrier, respectively, such that the plurality of mounting brackets are respectively protruded from the supporting bracket and the headlamp mounting portion of the carrier, each of the mounting brackets having a clip bifurcated from the mounting bracket such that when clamping the bumper-cover, the clip is inserted into the fastening groove of the establishment piece.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
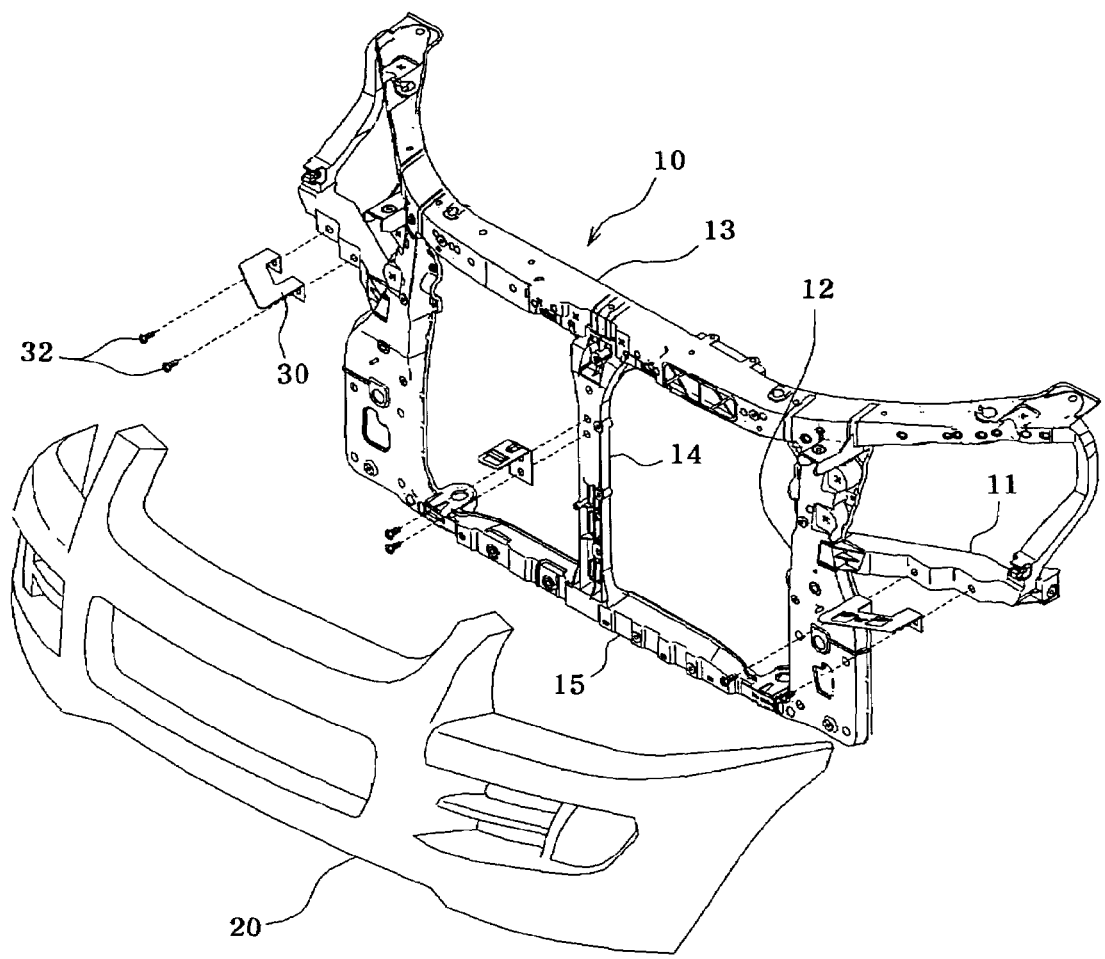
FIG. 1 is an exploded perspective view showing a state wherein a bumper-cover is mounted on a carrier according to conventional technology.
Figure 2:
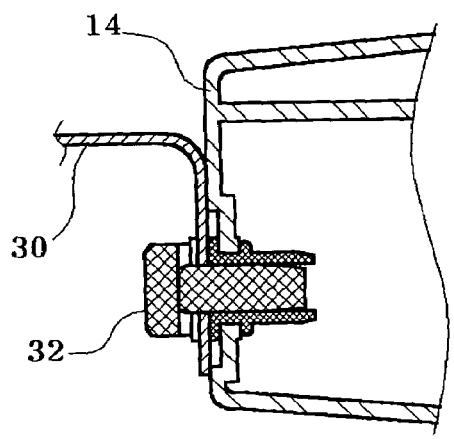
FIG. 2 is a cross-sectional view showing a state wherein a mounting bracket is fastened to the carrier according to the conventional technology.
Figure 3:
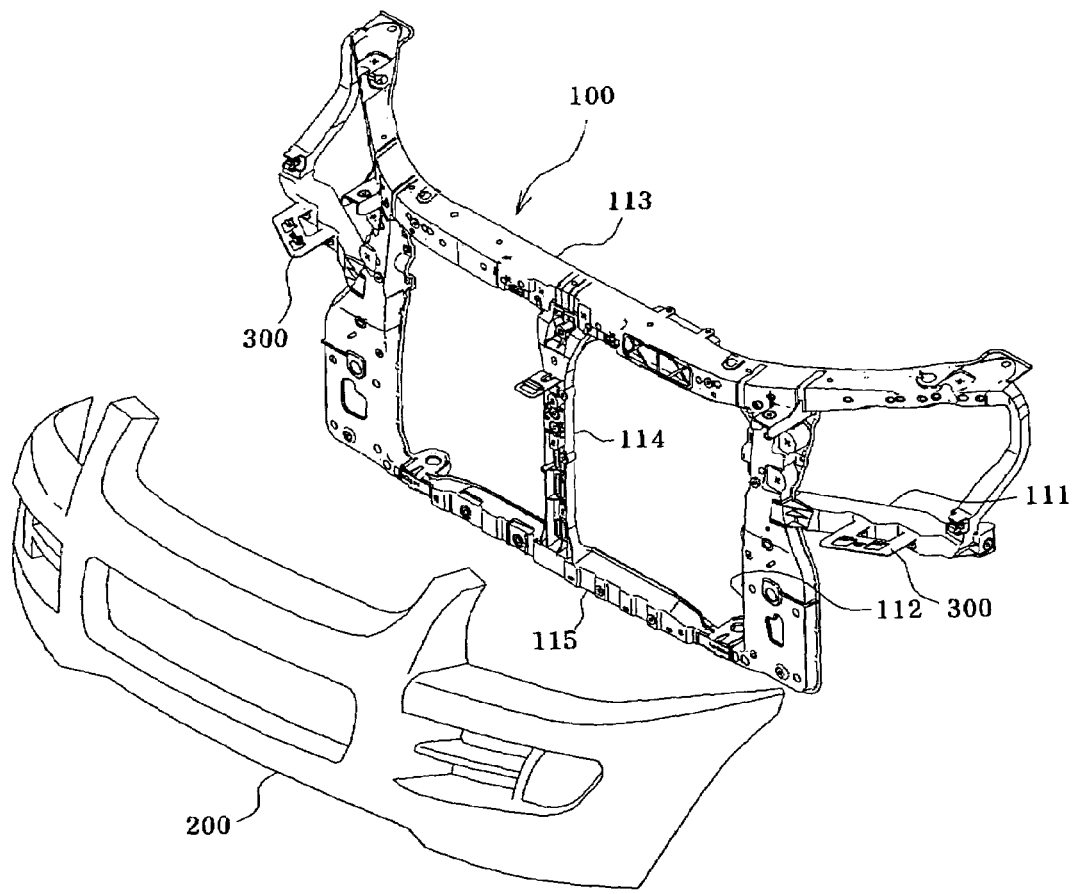
FIG. 3 is a perspective view showing a carrier having mounting brackets for mounting a bumper-cover on the carrier according to the present invention.
Figure 4:
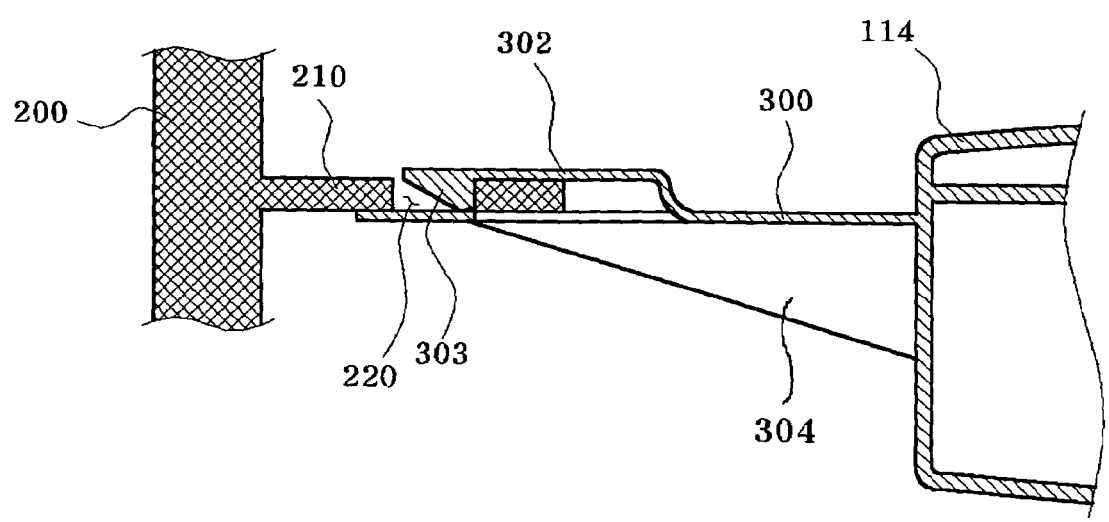
FIG. 4 is a cross-sectional view showing a state wherein the bumper-cover is mounted on the carrier integrally formed with the mounting brackets according to the present invention.

FIG. 3 is a perspective view showing a carrier having mounting brackets for mounting a bumper-cover on the carrier according to the present invention; and FIG. 4 is a cross-sectional view showing a state wherein the bumper-cover is mounted on the carrier integrally formed with the mounting brackets according to the present invention.

As shown in FIGS. 3 and 4, a bumper-cover mounting structure of a carrier according to the present invention includes: a carrier 100 provided at the front of an engine chamber in a vehicle frame and comprising a supporting bracket 114 for connecting an upper frame 113 and a lower frame 115, being in parallel to each other, at the center of the upper and lower frames 113 and 115, and a headlamp mounting portion 111 formed at either end of the upper frame 113; a bumper-cover 200 provided at the front of the carrier 100 for serving as a buffering member upon collision and comprising a plurality of establishment pieces 210 extending to define a fastening groove 220, respectively, at the rear side of the bumper-cover 200; and a plurality of mounting brackets 300 corresponding to the establishment pieces, respectively, and integrally formed on the supporting bracket 114 and the headlamp mounting portion 111 of the carrier 100, respectively, such that the plurality of mounting brackets 300 are respectively protruded from the supporting bracket 114 and the headlamp mounting portion 111 of the carrier 100. Each of the mounting brackets 300 has a clip 302 bifurcated from the mounting bracket 300 such that when clamping the bumper-cover 200, the clip 302 is inserted into the fastening groove 220 of the establishment piece 210.

The carrier 100 is fixedly mounted at the front of the engine chamber (not shown) in the vehicle frame, and is formed to allow the headlamp mounting portion 111 and a cooling module mounting portion 112 to be mounted thereon.

The cooling module mounting portion 112 of the carrier 100 is formed at an upper portion thereof with the upper frame 113, and at a lower portion thereof with the lower frame 115.

The upper and lower frames 113 and 115 are approximately parallel to each other, and are connected to each other via the support bracket 114 in such a manner that the support bracket 114 can hold the upper and lower frames 113 and 115.

Meanwhile, the carrier is mounted at the front side thereof with the bumper-cover 200.

The carrier 100 is integrally formed with the plurality of mounting brackets 300 for clamping the bumper-cover 200, such that the plurality of mounting brackets 300 are protruded from the carrier 100.

Preferably, the mounting brackets 300 are integrally formed on the headlamp mounting portion 111 and the supporting bracket 114 of the carrier 100.

Further, the mounting brackets 300 are protruded from the headlamp mounting portions 111, each of which extends to a lower portion of the upper frame 113 at either end of the carrier 100, and from the supporting bracket 114.

The mounting brackets 300 are formed at the front of the carrier 100 to be horizontal to the establishment piece 210 of the bumper-cover 200 in a straight line, so that the bumper-cover 200 is horizontally mounted on the carrier 100.

Although the mounting brackets 300 are integrally formed on the headlamp mounting portion 111 and on the supporting bracket 114 by welding or fusion bonding, it is preferable that the mounting brackets 300 be integrally formed on the carrier 100 by extrusion molding.

Further, each of the mounting brackets 300 is formed with a reinforcing rib 304, which has a thickness gradually increasing from one end of the reinforcing rib 304 to the other end formed on the headlamp mounting portion 111 or on the supporting bracket 114, thereby maintaining or increasing rigidity.

That is, when seen from the lateral side, the reinforcing rib 304 has a lower surface thereof downwardly sloping from the end of the reinforcing rib 304 to the other end formed on the carrier 100.

The mounting bracket 300 has a horizontal upper surface.

The mounting bracket 300 has one end formed to clamp the bumper-cover 200.

The mounting bracket 300 has the clip 302 bifurcated from the mounting bracket 300, such that the clip 320 is elastically fastened thereto.

The clip 302 is provided with a hook 303 downwardly protruded from the end of the clip 302.

At the rear side of the bumper-cover 200, the establishment piece 210 extends correspondent to the mounting bracket 300.

The establishment piece 210 is provided with the fastening groove 220, such that the hook 303 of the clip 302 is inserted thereto for mounting the bumper-cover 200 on the mounting bracket 300.

As is apparent from the above description, there is an advantageous effect in that the bumper-cover mounting structure of the carrier according to the present invention has the mounting brackets, for fastening the bumper-cover to the carrier, integrally formed with the carrier, thereby reducing an assembly process of the carrier and the mounting bracket, leading to enhancement of both assembly time and productivity.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A bumper cover mounting structure of a carrier comprising:
   a carrier configured to be provided at the front of an engine chamber in a vehicle frame, the carrier comprising a supporting bracket that connects an upper frame and a lower frame at the center of the upper and lower frames which are parallel to each other, and a plurality of headlamp mounting portions formed at opposite ends of the upper frame;
   a bumper cover configured to be provided at the front of the carrier that serves as a buffering member upon collision, the bumper cover comprising a plurality of establishment pieces extending to define a fastening groove, respectively, at the rear side of the bumper cover; and
   a plurality of mounting brackets corresponding to the plurality of establishment pieces, respectively, and integrally formed on the supporting bracket and the head lamp mounting portions of the carrier, respectively, such that the plurality of mounting brackets respectively protrude from the supporting bracket and the head lamp mounting portions of the carrier, each of the mounting brackets having a clip bifurcated from the mounting brackets such that when clamping the bumper cover, each clip is inserted into a respective one of the fastening grooves of the establishment pieces.

2. The bumper cover mounting structure as set forth in claim 1, wherein each of the mounting brackets has a reinforcing rib with a thickness increasing from one end of the reinforcing rib to the other end of the reinforcing rib formed on the carrier to maintain stiffness.

3. The bumper cover mounting structure as set forth in claim 1, wherein each of the mounting brackets is integrally formed on the carrier by extrusion molding.

* * * * *